(12) United States Patent
Richard

(10) Patent No.: US 11,520,914 B2
(45) Date of Patent: Dec. 6, 2022

(54) SECURED DOCUMENT AND ASSOCIATED SYSTEM AND METHOD FOR SECURING DOCUMENTS

(71) Applicant: QUADIENT TECHNOLOGIES FRANCE, Bagneux (FR)

(72) Inventor: Frederic Richard, Saint Andiol (FR)

(73) Assignee: QUADIENT TECHNOLOGIES FRANCE, Bagneux (FR)

(\*) Notice: Subject to any disclaimer, the term of this patent is extended or adjusted under 35 U.S.C. 154(b) by 997 days.

(21) Appl. No.: 16/247,858

(22) Filed: Jan. 15, 2019

(65) Prior Publication Data

US 2019/0220612 A1 Jul. 18, 2019

(30) Foreign Application Priority Data

Jan. 17, 2018 (EP) .................................. 18 30 5033

(51) Int. Cl.
*G06F 21/62* (2013.01)
*G06F 3/12* (2006.01)
(Continued)

(52) U.S. Cl.
CPC ........ *G06F 21/6209* (2013.01); *G06F 3/1222* (2013.01); *G06F 3/1238* (2013.01);
(Continued)

(58) Field of Classification Search
CPC .. G06F 21/6209; G06F 3/1222; G06F 3/1238; G06K 19/025; G06K 19/07309;
(Continued)

(56) References Cited

U.S. PATENT DOCUMENTS

| 7,333,001 B2 * | 2/2008 | Lane | G07F 7/12 |
| | | | 340/5.86 |
| 8,505,978 B1 * | 8/2013 | Leon | G07B 17/00024 |
| | | | 283/67 |

(Continued)

FOREIGN PATENT DOCUMENTS

| EP | 1 867 486 A1 | 12/2007 |
| JP | 2004276515 A | * 10/2004 |

OTHER PUBLICATIONS

JP2004276515A—Printer and Control method therefor, machine translation, 8 pages (Year: 2022).*

(Continued)

*Primary Examiner* — Tuyen K Vo
(74) *Attorney, Agent, or Firm* — Cozen O'Connor

(57) ABSTRACT

For protecting confidential information in a printed document, the invention provides a system and method for, on one hand, encrypting the confidential content of the document and then printing the part or parts of the document with confidential information in an encrypted form and the rest of the document in a non-encrypted form, and, on the other hand, decrypting the encrypted document content for display and use or for printing. In addition, for preventing unauthorized copying and tampering of a printed document, the invention provides a system and method for managing a unique tag, which is attached to the document and which authenticates the document.

42 Claims, 5 Drawing Sheets

(51) Int. Cl.
*G06K 19/02* (2006.01)
*G06K 19/14* (2006.01)
*G06K 19/077* (2006.01)
*G06K 19/073* (2006.01)
*G07B 17/00* (2006.01)

(52) U.S. Cl.
CPC ....... *G06K 19/025* (2013.01); *G06K 19/0776* (2013.01); *G06K 19/07309* (2013.01); *G06K 19/145* (2013.01); *G07B 17/00508* (2013.01); *G07B 17/00733* (2013.01); *G07B 2017/0058* (2013.01); *G07B 2017/0062* (2013.01); *G07B 2017/00443* (2013.01); *G07B 2017/00629* (2013.01)

(58) Field of Classification Search
CPC ............. G06K 19/0776; G06K 19/145; G07B 17/00508; G07B 17/00733; G07B 2017/00443; G07B 2017/0058; G07B 2017/0062; G07B 2017/00629
See application file for complete search history.

(56) References Cited

U.S. PATENT DOCUMENTS

| | | | |
|---|---|---|---|
| 9,369,287 B1* | 6/2016 | Sarvestani | G07D 7/01 |
| 2006/0010086 A1* | 1/2006 | Klein | G07B 17/00508 |
| | | | 705/410 |
| 2007/0083381 A1 | 4/2007 | Farrell et al. | |
| 2007/0118479 A1* | 5/2007 | Halsema | G06Q 20/382 |
| | | | 705/51 |
| 2012/0066153 A1* | 3/2012 | Whitehouse | G07F 17/42 |
| | | | 705/407 |
| 2015/0381572 A1* | 12/2015 | Forte | H04L 63/062 |
| | | | 713/171 |
| 2016/0182239 A1* | 6/2016 | Terborg Del Rosal | |
| | | | H04N 1/32304 |
| | | | 713/175 |

OTHER PUBLICATIONS

European Search Report for European Application No. EP 18 30 5033, dated Jun. 27, 2018, 2 pages.

\* cited by examiner

SECURED DOCUMENT AND ASSOCIATED SYSTEM AND METHOD FOR SECURING DOCUMENTS

FIELD OF THE INVENTION

The present disclosure relates to the securing of printed documents and more particularly to prevent any unwanted copying of or tampering with printed documents as well as to protect confidential information in printed documents.

BACKGROUND

Confidential or official documents printed on paper generally are transmitted and/or stored with limited protection. With today's technologies, confidential documents can be quite easily copied or digitalized, and eventually can be digitally altered. Digital photocopiers are widely available and can be used for copying and tampering with confidential or official documents. Identity theft is a common issue and often rely on copying an original document and changing some personal information in the document such as an original name in order to illegally use the tampered document. There is therefore a need for securing printed documents so as to prevent any unwanted copying and tampering, and to provide easy and straightforward evidencing of any unwanted copying and tampering of confidential or official printed documents.

With the increasing technical capabilities for storing and processing massive amount of data, the management of personal and confidential information has become a major concern. This is particularly critical for printed documents, which are used in multiple forms, and are often exchanged and transmitted in non-secured environment and via multiple third parties. Often the content of such printed documents comprises confidential or personal information, which may be read and captured by unauthorized third parties and misused. Examples of documents containing confidential or personal information include official documents and personal or confidential statements exchanged between individuals or organizations. Another example is in the logistics and shipping industry where shipping labels and tracking documents may contain confidential information, which needs to be protected. Generally, the generic or standard content parts of a printed document needs to be clearly accessible and readable for facilitating the use of the document, and only the confidential content part of the document needs to be protected. Therefore, there is a need for protecting confidential information in printed documents.

SUMMARY

Various solutions for both preventing unwanted copying and tampering of printed documents and protecting confidential information in printed documents are described herein.

A method for printing a secured document may be summarized as including: providing a blank document with an attached tag, containing a unique tag identification, of reading the attached tag and extracting the unique tag identification contained in the attached tag, of generating a unique cryptographic key, of associating the unique cryptographic key with the unique tag identification, of identifying confidential information to be included in the secured document, of encrypting the confidential information with at least the cryptographic key, of preparing data for printing the secured document including the confidential information in an encrypted form, and of printing the secured document.

According to a feature, the confidential information is encrypted with the document key and the unique tag identification.

In a preferred embodiment, the reading and the printing are both performed by a printer having the capability to perform the reading of the attached tag.

The attached tag may be machine writeable and is written onto with the printer.

According to another feature, the reading is based on radio frequency technology (e.g., wireless interrogation) and the attached tag is a radio frequency identification (RFID) wireless transponder or tag or a near field communications (NFC) transponder or tag.

One particular advantage of the described embodiments of the invention is the attached transponder or tag contains other information than the unique tag identification and at least some of the other information is comprised in the data for printing the secured document.

In a particular embodiment of the method for printing a secured document, the secured document is a secured shipping label.

Preferably, the method further comprises attaching the secured shipping label onto an item due to be shipped.

Advantageously, the blank document for printing the secured shipping label is self-adhesive and is provided on a roll.

A computerized system for printing a secured document on a blank document including an attached tag containing a unique tag identification, may be summarized as including: a tag reader for reading the attached tag and extracting the unique tag identification contained in the attached tag, a cryptographic module and a document management module, characterized in that the cryptographic module is operable to generate a unique cryptographic key and to encrypt confidential information with at least the unique cryptographic key, wherein the document management module comprises structure to associate the unique cryptographic key with the unique tag identification and to identify the confidential information to be included in the secured document and to prepare data for printing the secured document including the confidential information in an encrypted form and a printer for printing the secured document.

Preferably, the cryptographic module comprises structures to encrypt the confidential information with the cryptographic key and the unique tag identification.

In a preferred embodiment, the document management module comprises structures that uniquely associate the unique cryptographic key with the unique tag identification.

Advantageously, the tag reader is integrated in a print head of the printer.

According to a feature, the tag reader is a radio frequency reader and the attached tag is a RFID tag or a NFC tag.

One particular advantage of the approaches described herein is that the tag contains other information than the unique tag identification and at least some of the other information is comprised in the data for printing prepared by the document management module.

In a particular embodiment of the system for printing a secured document, the secured document is a secured shipping label.

The printer may comprises structures to handle rolls of blank shipping labels.

A method for decrypting a secured document including encrypted confidential information and an attached tag containing a unique tag identification, may be summarized as including: storing the unique tag identification and a unique cryptographic key, associating the unique tag identification and the unique cryptographic key, capturing an image of the secured document, of reading the attached tag and extracting the unique tag identification contained in the attached tag, comparing the extracted unique tag identification with the unique tag identification, selecting the unique cryptographic key associated with the unique tag identification based on a successful matching of the unique tag identification extracted from the attached tag with the unique tag identification, of decrypting the encrypted confidential information with at least the cryptographic key.

Preferably, the encrypted confidential information is decrypted with the cryptographic key and the unique tag identification.

In a preferred embodiment, the reading of the method for decrypting a secured document is based on radio frequency technology and the attached tag is a RFID transponder or tag or a NFC transponder or tag.

According to a feature, the method for decrypting a secured document further comprises receiving the cryptographic key and the unique tag identification from a remote device.

According to another feature, the method for decrypting a secured document further comprises displaying an image of the secured document in a decrypted form.

In another embodiment, the method for decrypting a secured document further comprises printing the secured document in a decrypted form.

In a particular embodiment, the secured document of the method for decrypting a secured document is a secured shipping label.

A computerized system for decrypting a secured document including encrypted confidential information and an attached tag containing a unique tag identification, may be summarized as including: a first memory for storing the unique tag identification and a second memory for storing a unique cryptographic key, a document capture module for capturing an image of the secured document, a tag reader for reading the attached tag and extracting the unique tag identification contained in the attached tag, a processor for uniquely associating the unique tag identification and the unique cryptographic key and for selecting the unique cryptographic key based on a successful matching of the unique tag identification extracted from the attached tag with the unique tag identification, and a cryptographic module operable to decrypt the encrypted confidential information with at least the cryptographic key.

Preferably, the cryptographic module of the computerized system comprises structures that decrypt the encrypted confidential information with the cryptographic key and the unique tag identification.

According to a feature, the structures that associate the cryptographic key with the unique tag identification include a database stored in one or more nontransitory processor-readable medium, storing the cryptographic key and the unique tag identification and allowing for their association.

In a preferred embodiment, the tag reader of the computerized system for decrypting a secured document is a radio frequency reader and the attached tag is a RFID tag or a NFC tag.

According to another feature, the computerized system for decrypting a secured document further comprises a communication module having structures to receive the cryptographic key and the unique tag identification from a remote device, for example one or more wired or wireless communications ports.

In another embodiment, the computerized system for decrypting a secured document further comprises a display module with one or more displays operable to display an image of the secured document in a decrypted form.

Advantageously, the computerized system for decrypting a secured document comprises a mobile device such as a smartphone.

According to another feature, the computerized system for decrypting a secured document further comprises a printer for printing the secured document in a decrypted form.

In a particular embodiment of the computerized system for decrypting a secured document, the secured document is a secured shipping label.

A secured document may be summarized as including a blank document, an attached tag and encrypted confidential information to be printed on the blank document with other non-confidential data, characterized in that the attached tag contains a unique tag identification and the encrypted confidential information is encrypted with a cryptographic key associated with the unique tag identification.

Preferably, the encrypted confidential information of the secured document is encrypted with the cryptographic key and the unique tag identification.

One particular advantage is that the attached tag of the secured document is unfalsifiable.

In a particular embodiment, the attached tag of the secured document is a radio frequency transponder or tag.

According to a feature, the attached tag of the secured document contains a unique tag identifier encoded or otherwise embedded into the tag.

Advantageously, the unique tag identification of the secured document is the unique tag identifier.

In a preferred embodiment, the attached tag of the secured document contains other information than the unique tag identification and at least some of the other information is comprised in data printed on the secured document.

According to another feature of the secured document, the information contained in the attached tag is limited to the unique tag identification.

In a particular embodiment, the secured document is a secured shipping label consisting in a self-adhesive blank shipping label provided within a roll, on which can be printed at least the encrypted information.

BRIEF DESCRIPTION OF THE DRAWINGS

Other aspects, features and advantages of the teachings of the invention will become clearer to those ordinary skilled in the art upon review of the following description in conjunction with the accompanying drawings where.

DETAILED DESCRIPTION

For protecting confidential information in a printed document, the invention provides a system and method for, on one hand, encrypting the confidential content of the document and then printing the part or parts of the document with confidential information in an encrypted form and the rest of the document (the remaining non-confidential content) in a non-encrypted form, and, on the other hand, decrypting the encrypted document content for display and use or for printing. In addition, for preventing unauthorized copying and tampering of a printed document, the invention provides a system and method for managing a unique tag, which is attached to the document and which authenticates the document. The tag can be used for encrypting, partially or fully, the printed document, and then for identifying the document before decryption. Examples of preferred tag technologies are radio frequency technologies such as RFID or NFC for which tag writing and tag reading technologies are well known by those ordinary skilled in the art. An important and most convenient aspect of the invention is that only the content of the document is printed (in encrypted or none-encrypted form) and no additional information needs to be printed either for authenticating the document or for identifying the document. For example, in some prior art applications, a signature, typically in an encrypted form, would be additionally printed onto a document in order to authenticate the document. According to the invention, such a signature additional printing is not required as the document authentication can be performed with the tag attached to the document.

Figure 1A:
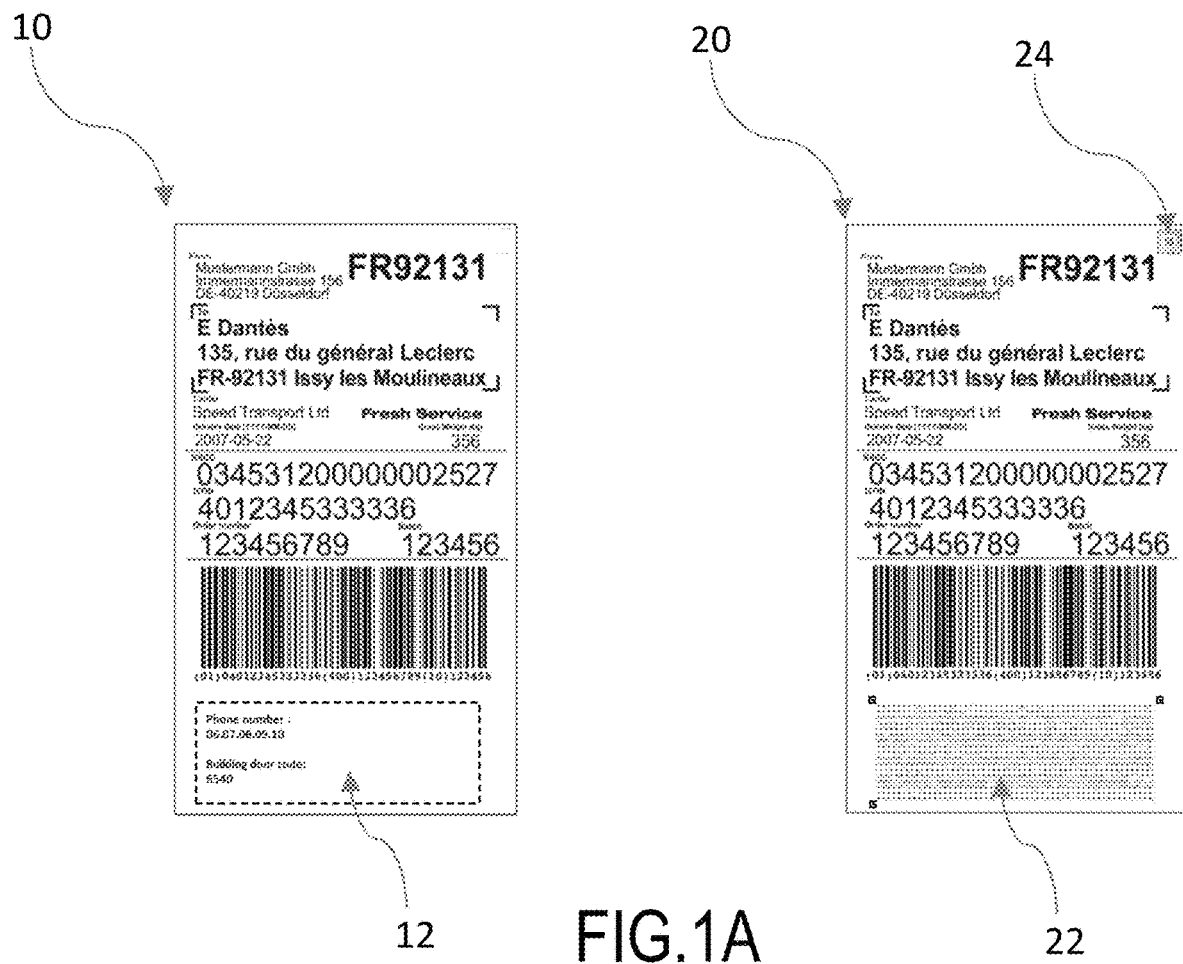
FIG. 1A illustrates a result of an encryption of confidential information for a printed shipping label.

FIG. 1A illustrates a result of the encryption of a printed document according to the invention in the case of a shipping label, which is attached onto a shipping item and which typically is used for identifying and tracking the shipping item. A printed content of a standard shipping label 10 typically can include at least one printed area with confidential document content 12. For standard shipments, this confidential document content may include delivery instructions or shipment content description or consignee details, including identifications or addresses. In order to protect the confidential document content, a secured shipping label 20 is printed according to the invention with the confidential document content in an encrypted form 22. According to the invention, the document content, i.e., the shipping information in the particular application described herein, is printed on a blank label on which a tag 24 is attached.

Figure 1B:
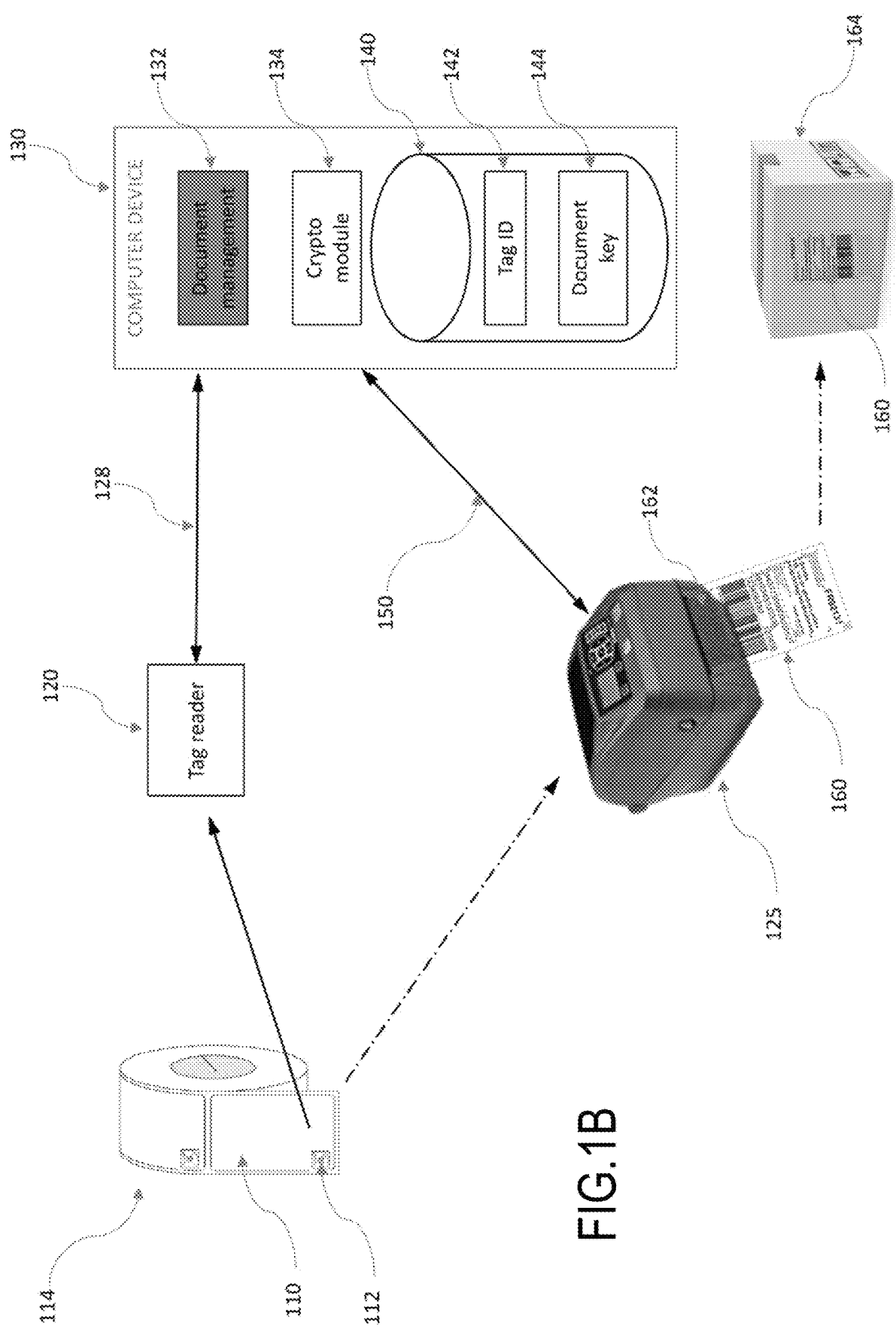
FIG. 1B represents a system for printing a secured shipping label.

A system for printing a secured shipping label is presented on FIG. 1B. A blank shipping label 110 is provided with a tag 112 securely attached onto the label. In a preferred embodiment, any attempt for separating the tag from the shipping label results in making the shipping label unusable for shipping purpose. Blank shipping labels with attached tags are preferably self-adhesive and can be provided on rolls 114. The tag contains information, which is machine readable. This information includes at least a unique identification associated with the tag called tag ID, which is generated during the manufacturing process of the tag or during the manufacturing combination of the tag with the label. Other information included in the tag may relate to the particular shipping item, on which the shipping label is attached, or to the different parties involved in the shipment such as the shipping carriers. If the tag is machine writeable, this other information may be written onto the tag during the shipment process. In order to minimize costs, the machine readable information contained in the tag may be limited to the tag ID.

An important characteristic of the system is that the tag is unfalsifiable and is made unique for example by carrying a unique tag identifier, which may not be copied onto another tag. In the case of RFID or NFC tags, the unique tag identifier is called TID (Tag IDentifier), which is embedded by the manufacturer of the tag and which is made unique by the manufacturing process. This unique tag identifier may be used as the tag ID.

The system of FIG. 1B includes a tag reader 120, a printer 125, and a computer device 130 for encrypting any confidential document content and creating documents to be printed. The tag reader 120 has the capability to read the tags 112 attached onto the shipping labels 110 and can communicate the information extracted from the tags to the computer device 130 via a communication link 128. The computer device 130 comprises, in addition to standard modules well known by those ordinary skilled in the art of the operation of a computer device, a document management module 132 and a crypto module 134 for encrypting document content and a storage 140 comprising a memory 142 for storing the tag ID captured and transmitted by the tag reader 120. The document management module 132 has means for managing the data to be printed on the label 110 and has means to identify confidential document content within the data to be printed on the label 110. The crypto module 134 has means to generate a unique cryptographic key called document key. The generation of this unique cryptographic document key can be carried out according to standard cryptographic method well known by those ordinary skilled in the art of cryptography, and, depending on the application, can for example use some unique information included in the document to be secured or the time of generation of the key. The document key is stored in a memory 144 of the storage 140 and is associated with the tag ID stored in memory 142 by the document management 132, therefore associating the document key with the shipping label 110 and the tag 112. In a preferred embodiment of the invention, the storage 140 is structured as a database allowing for the storage of unique associations of a tag ID and a document key, each of these associations corresponding uniquely to a shipping label. The crypto module 134 has means for encrypting the confidential document content provided by the document management module 132 with at least the document key, and eventually also with the tag ID combined with the document key. In a simpler embodiment of the invention, the encryption is performed only with the document key. The document management module 132 also has means for preparing the data for printing a secured shipping label by combining the encrypted confidential document content received from the crypto module 134 and the rest of the none-confidential content of the shipping label. The data prepared by the document management module may include some of the other information included in the tag (other than the tag ID), which may be captured by the tag reader. If the tag is machine writeable, this other information may be written onto the tag during the shipment process.

The data for printing the secured shipping label is communicated under the control of the computer device 130 via a communication link 150 to the printer 125, which can print a secured shipping label 160 comprising at least one area 162 printed in an encrypted form. The secured shipping label 160 can then be attached onto the corresponding item 164 due to be shipped. In a convenient embodiment of the invention, the tag reader 120 can be integrated into the printer 125. Preferably, the tag reader is integrated in the print head of the printer and the printer has the capability to perform the reading of the tag attached on the shipping label during the printing process of the label. It is then preferable for the tag to be positioned on the top edge on the shipping label, i.e. the first edge going through the printer and under the print head so that the tag information can be captured as early as possible, and can then eventually be used for example for encrypting any confidential document content comprised in the data printed on the shipping label. Conveniently, the printer can have the capability to handle rolls of blank shipping labels so that when the blank shipping labels are provided on a roll, the roll can be loaded onto the printer for multiple successive printings.

In a particular embodiment of the invention, the database 140 storing tag IDs and the document keys associated with each of these tag IDs as well as their associations may be stored only temporarily in the computer device 130 until the tag IDs and the document keys and their associations are successfully transferred to external devices, which, for example, are due to use the tag IDs and the associated document keys or are in charge of distributing the tag IDs and the associated document keys to the appropriate devices. In particular, the database may be stored in volatile memory and transferred temporarily to non-volatile memory only in case of unsuccessful transfer to external devices.

The computer device can be located on the premises where the printing and preparation for the shipment takes place. In such a case, all the modules related to the computer device 130 for preparing and printing a secured shipping label must be provided on premises via for example some software downloads or some local software installations. However, such services can also be provided in SaaS mode (Software as a Service). In that case, some or all the modules related to the computer device 130 are located in a remote web server and are used via internet by a local client computer device for printing locally secured shipping labels. The computer device 130 must be then understood as composed of a local client computer device with a web browser using via internet the services of a remote web server.

It will be understood by those skilled in the art that the system for printing secured shipping label described above may be applied to any printed document, which requires to be secured in particular regarding some confidential information, without departing from the spirit and scope of this invention. The system may be used in particular for documents such as official documents or personal or confidential statements exchanged between individuals or organizations, including for example the distribution of PIN codes for credit cards and bank cards. When the exchanged information requires several separate printed pages, preferably each printed page carries an attached tag, which is unfalsifiable and is made unique as it carries a unique tag identifier, which may not be copied onto another tag.

Figure 2A:
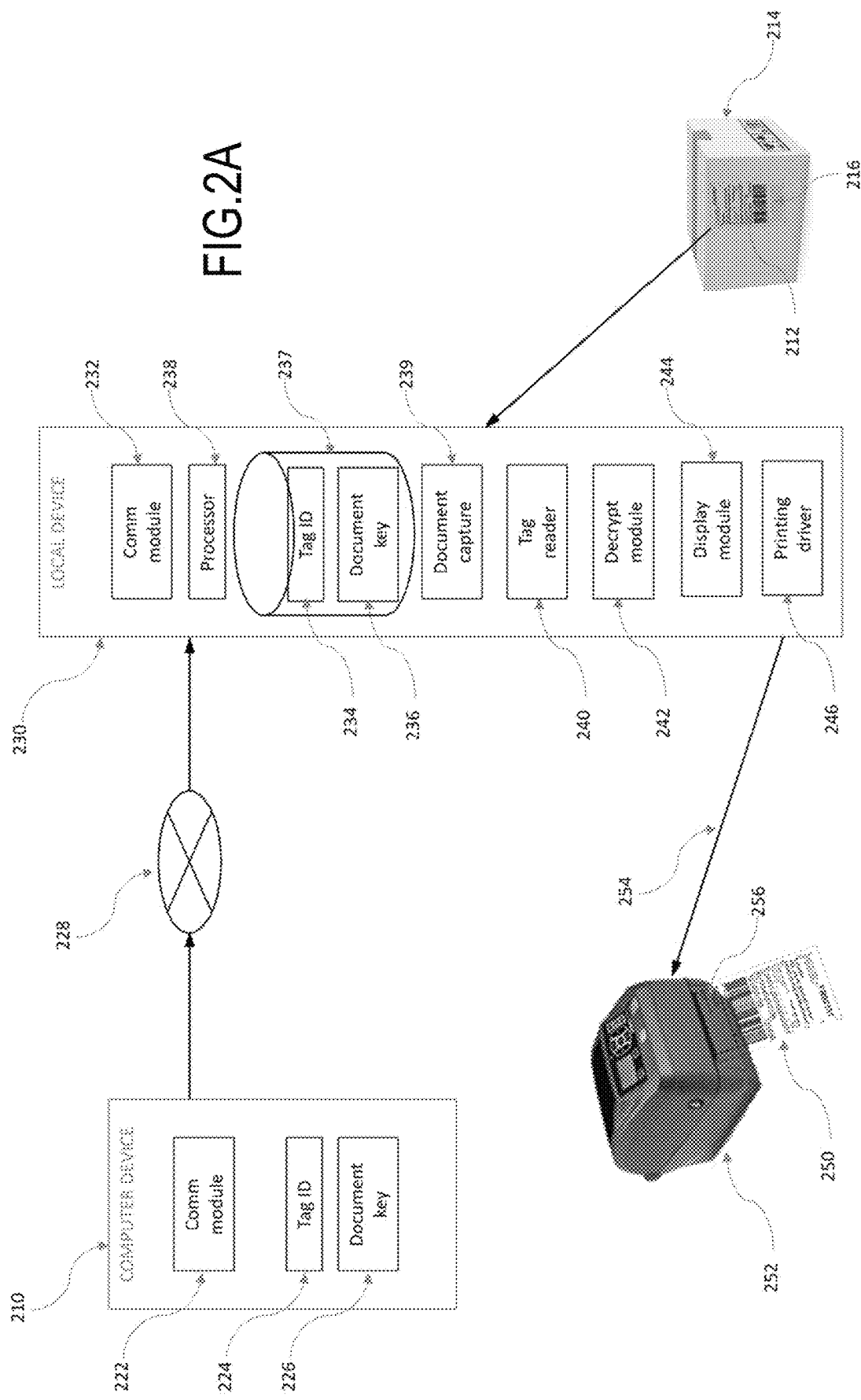
FIG. 2A represents a system for reading a secured shipping label and decrypting confidential information printed on the secured shipping label.

Once a secured shipping label has been printed and is attached onto a shipping item, a system presented on FIG. 2A allows managing the secured shipping label and in particular handling the confidential document content printed in an encrypted form on the label. The system of FIG. 2A includes a computer device 210 in charge of distributing the required data relative to a secured shipping label 212 attached to a shipping item 214—required data, which is in particular used for reading and decrypting the secured shipping label. A unique tag including an embedded tag ID is attached to the secured shipping label 212, which includes at least one printed area 216 with confidential document content printed in an encrypted form. The at least one printed area with confidential document content is encrypted with at least a document key, and eventually also with the tag ID combined with the document key. The computer device 210 comprises, in addition to standard modules well known by those ordinary skilled in the art of the operation of a computer device, a communication module 222 and a memory 224 for storing a unique tag ID associated with the secured shipping label 212 and a memory 226 for storing the document key, which is associated with the tag ID stored in memory 224 by the computer device 210, therefore associating the document key with the secured shipping label 212 and with the tag ID. The communication module 222 allows the computer device 210 to communicate with a computerized local device 230 via a communication channel 228, which generally supports long distance communication such as GSM or internet. The communication module 222 can in particular transmit the tag ID and the document key associated with the secured shipping label 212 to the communication module 232 of the local device 230, where the tag ID can be stored in a memory 234 and the document key can be stored in a memory 236, and where the tag ID and the document key are associated in a database 237 including these two memories. Preferably, the tag ID and the document key are uniquely associated in the database 237.

Figure 2B:
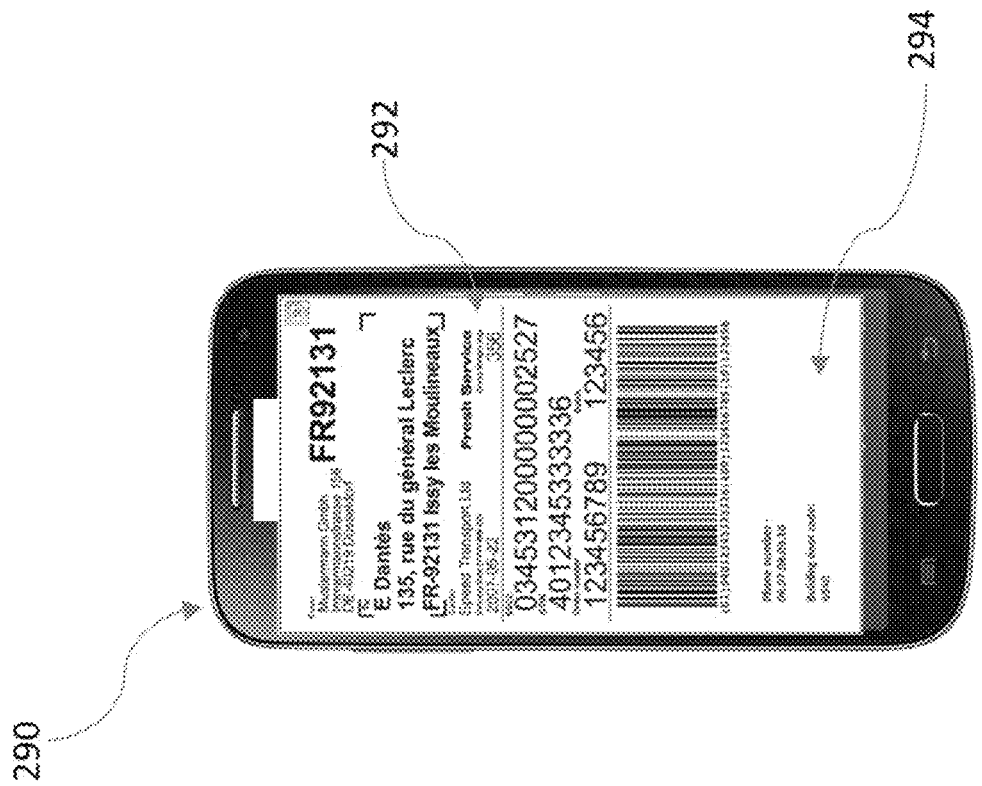
FIG. 2B illustrates a result of a decryption of confidential information for a printed shipping label and display on a mobile local device.
Figure 2B:
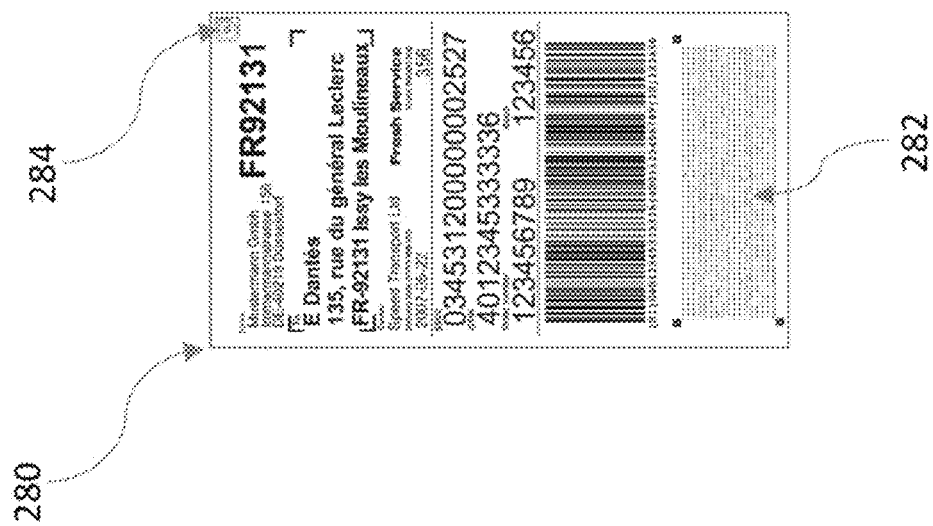

In addition to standard modules well known by those ordinary skilled in the art of the operation of a computer device such as a processor 238, the local device 230 comprises, a document capture module 239, a tag reader module 240, a decryption module 242 and a display module 244. The document capture module 239 includes means for capturing an image of a document and in particular an image of the secured shipping label 212. The tag reader module 240 has the capability to read the tag attached onto the secured shipping labels 212, and in particular read the tag ID embedded in the tag. Preferably, the tag technologies are radio frequency technologies such as RFID or NFC for which tag reading technologies are well known by those ordinary skilled in the art. The tag ID read by the tag reader and therefore captured by the local device can be matched by the processor with the tag ID stored in memory 234 by the local device. A successful tag ID matching allows the processor 238 to select the associated document key stored in memory 236, which is used for decrypting the secured shipping label. The decryption module 242 can then decrypt the secured shipping label encrypted area 216 captured by the document capture module 239 by using at least the document key and eventually also the tag ID combined with the document key, which are stored in the memory 234 and in the memory 236, and which are associated with the secured shipping label 212. In a preferred embodiment, the document capture module and/or the decryption module can include a character recognition functionality for facilitating the decryption of the encrypted area of the secured shipping label 212. The display module 244 can display for the user of the local device 230 an image of the secured shipping label 212, where the confidential document content, which is printed in an encrypted form on the secured shipping label, appears in a decrypted form on the display. FIG. 2B illustrates a result according to the invention of the decryption and display of a secured shipping label, which is attached on a shipping item and which typically is used for identifying and tracking the shipping item. A secured shipping label 280 includes at least one printed area with encrypted confidential document content 282. Additionally, a tag 284 is attached onto the secured shipping label 280. The local device is a mobile device 290 such as a smartphone or a PDA with the capability for reading the tag 284 and capturing the image of the secured shipping label 280. After decryption of the printed area with encrypted confidential document content 282, an image of the shipping label can be displayed on the screen 292 of the mobile device. The confidential document content 282, which is printed in an encrypted form on the secured shipping label, appears in a decrypted form 294 on the display.

In a typical usage case, a user of the mobile local device needs to identify and track several items in the field, and therefore needs to be able read several different secured shipping labels. Each secured shipping label is uniquely associated with a unique tag ID embedded in a unique tag attached to the secured shipping label and a unique document key generated for the printing of the secured shipping label. In a preferred embodiment of the invention, the tag IDs and the document keys of the different secured shipping labels to be read are stored in the local device in a database allowing for unique associations of a tag ID and a document key, each of these associations corresponding uniquely to a secured shipping label. When a tag attached to a secured shipping label is read and the tag ID is captured by the mobile local device, this captured tag ID can be compared to the tag IDs pre-stored in the mobile local device. A successful tag ID matching allows for selecting the associated document key and then for performing the decryption of the secured shipping label using the appropriate document key.

Often, an item needs to be identified and tracked by several users in the field, and therefore a secured shipping label attached to the item needs to be read by several different local devices. In such a case of reading of a secured shipping label by multiple local devices, the distribution for same label data required for reading the secured shipping label, including in particular the tag ID and the document key associated with the secured shipping label, is distributed by the computer device 210 to the appropriate local devices. The computer device 210 performing the distribution of the data required for reading secured shipping labels can be the same as the computer device 130 performing the printing of secured shipping labels. The computer devices 210 and 130 can also be separate devices, for example when the printing of secured shipping labels is performed by different computer devices 130 localized in different places and the data required for reading secured shipping labels is concentrated in a computer device 210 for distribution to local devices 230 of the data required for reading secured shipping labels. The data required for reading secured shipping labels, including in particular the tag ID and the document key associated with the secured shipping labels, is transmitted from the different computer devices 130 to the computer device 210 via communication channels, which generally support long distance communication such as GSM or internet, and which are well known by those ordinary skilled in the art.

A clear benefit of having all the modules related to the local device functionalities physically localized within the local device, in particular the decryption module and the storage of the tag ID and of the document key, is that the local device can operate even if the local device cannot communicate temporarily with the outside world. Such a loss of communication can occur for example when a mobile local device, which communicates via long distance wireless communication with the outside world and in particular with a computer device 210, is temporarily used in an area not well covered by long distance wireless communication. It is therefore beneficial that all the necessary modules described above be locally installed onto the local device, in particular via some local software installation, or downloaded onto the local device, in particular via some software download from a remote server. However, such functionalities can also be provided in SaaS mode (Software as a Service). In that case, some modules related to the computer device 230 are located in a remote web server and are used via internet by a local client computer device for managing locally secured shipping labels. The local device 230 must be then understood as composed of a local client computer device with a web browser using via internet the services of a remote web server.

It will be understood by those skilled in the art that the system for decrypting a secured shipping label described above may be applied to any printed document, which requires to be secured in particular regarding some confidential document content, without departing from the spirit and scope of the invention. The system may be used in particular for documents such as official documents or personal or confidential statements exchanged between individuals or organizations, which require some authentication means in order to avoid copying the documents or tampering with the documents. The attachment onto each secured document of a tag, which is unfalsifiable and is made unique as it carries a unique tag identifier, ensures that the secured document cannot be copied, and therefore tampered with. As the unique tag identifier cannot be copied onto another tag, the secured document is made unique and unfalsifiable. When the document consists in several separated printed pages, preferably each printed page carries an attached tag. During the generation of a secured document, confidential document content is printed in an encrypted form on at least one area of the secured document with an attached tag. Following on the decryption of a secured document, a decrypted form of the document may eventually need to be printed by the user of the local device 230. Therefore, as illustrated on FIG. 2A, the local device 230 may include a printing driver 246 for driving the printing of a decrypted form 250 of the document by a printer 252 via a communication link 254. The at least one area of the secured document printed in an encrypted form is printed in a decrypted form 256 on the printed document 250.

Figure 3:
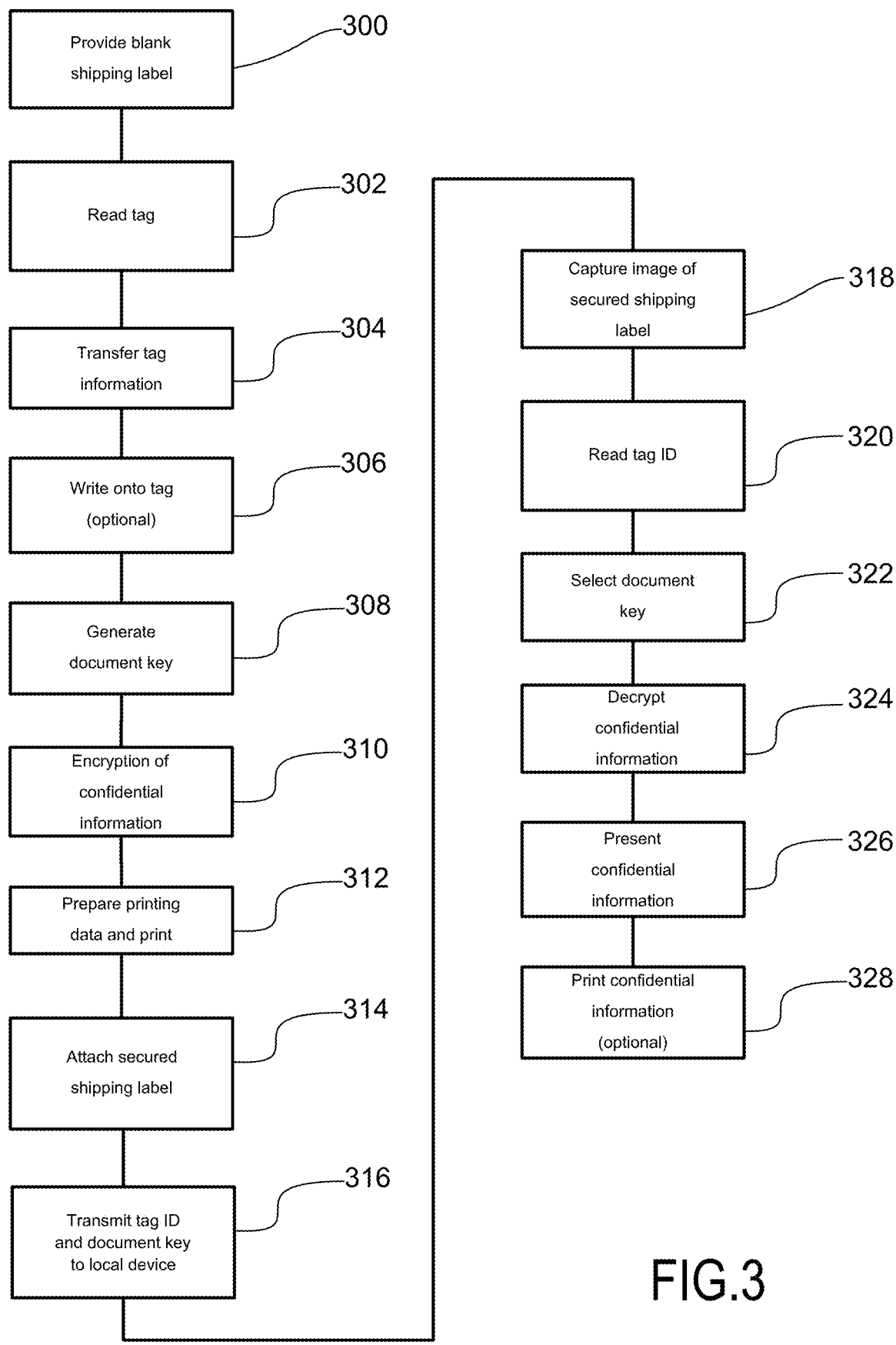
FIG. 3 represents a flow diagram of the method of the present invention relative to the printing of a secured shipping label and the reading a secured shipping label and the decryption of confidential information printed on the secured shipping label.

FIG. 3 depicts a flow diagram of the method of the present invention in the case of a shipping label illustrated in FIG. 1A. The method allows for protecting confidential document content in a secured shipping label by encrypting the confidential document content, and allows for using and reading the secured shipping label when needed in the field by decrypting the confidential document content of the secured shipping label. The method flow begins at act 300 by providing a blank shipping label with an unfalsifiable unique tag securely attached onto the label. Blank shipping labels with attached tags are preferably self-adhesive and can be provided on rolls. The tag contains information comprising at least a unique tag identification, which is associated with the tag and which is called tag ID. This tag ID is generated either during the manufacturing process of the tag or during the manufacturing combination of the tag with the label. The tag ID is used as an identification of the secured shipping label and can be used for encrypting confidential document content printed on the secured shipping label. In act 302, the tag attached onto the blank shipping label is automatically read and at least the tag ID is captured from the tag. In the case of radio frequency technology usage such as RFID or NFC technology, the tag is placed in the vicinity of a radio frequency reader and information available in the tag is automatically captured. Then the information read in the tag, including at least the tag ID, is transferred to a document management module, which manages the data to be printed on secured shipping labels and the printing of secured shipping labels (act 304). The document management module is typically installed on a computer device with standard electronic components and standard software modules well known by those ordinary skilled in the art of the operation of a computer device. If the tag is machine writeable, the tag may also be written onto with some other information, which may be read and used later on at different stages of the shipping process (act 306). This other information may relate to the particular shipping item on which the shipping label is attached or to the different parties involved in the shipment such as the shipping carriers. Such additional information may also have been written onto the tag earlier on during the manufacturing or the preparation of the blank shipping label, and some of this additional information may be read during the automatic reading act 302. The document management module is provided with the data for printing a secured shipping label either by the shipping carriers or by the shippers, and can identify confidential document content within the data to be printed on the blank shipping label as defined by the shipping carriers or by the shippers. In act 308, a unique cryptographic key, called document key, is generated and is associated with the tag ID, which has been read in act 302, i.e. the document key is associated with the shipping label on which is attached the tag carrying that particular tag ID. Preferably, the document key is uniquely associated with the tag ID. Then, the confidential document content to be printed on the secured shipping label is encrypted with at least the document key, and eventually also with the tag ID combined with the document key (act 310). In a simpler embodiment of the invention, the encryption is performed only with the document key. The data for printing the secured shipping label is prepared by combining the encrypted confidential document content and the rest of the data for the shipping label, and the secured shipping label is printed (act 312). The secured shipping label can then be attached onto the corresponding item due to be shipped (act 314).

During the shipping process, an item with a secured shipping label generally needs to be tracked and traced, and the confidential document content printed in an encrypted form on the label may need to be read and used. In each location and at each stage where the secured shipping label needs to be read and used, a local device is provided for automating the process, and preferably, this local device is mobile for convenience for the user. The local device is provided with the necessary data regarding the secured shipping label to be read, and in particular the tag ID and the document key associated with the secured shipping label are transmitted to the local device (act 316). The local device captures an image of the secured shipping label (act 318), and reads the tag attached onto the secured shipping label, and in particular reads the tag ID embedded in the tag (act 320). The tag ID read and captured by the local device can be matched with the tag ID previously transmitted to the local device. A successful tag ID matching allows the local device to select the associated document key, which was also previously transmitted with the tag ID to the local device (act 322). The local device can then use the document key associated with the tag ID for decrypting the secured shipping label. An encrypted area 216 printed on the secured shipping label can be identified as an encrypted area by specific signs printed in the vicinity of the encrypted area.

The decryption module 242 decrypts the secured shipping label encrypted area 216 captured by the document capture module 239 by using at least the document key, which is stored in the memory 236, and eventually also the tag ID, which is stored in the memory 234, combined with the document key. Preferably, the document key stored in the memory 236 is uniquely associated with the tag ID stored in the memory 234.

The encrypted area of the secured shipping label containing the confidential document content is decrypted by using the document key and eventually also by using the tag ID combined with the document key, which are associated with the secured shipping label (act 324). The data read from the secured shipping label is processed by the local device and the user is presented with the required data printed on the secured shipping label, where the confidential document content, which is printed in an encrypted form on the secured shipping label, appears in a decrypted form (act 326). In a preferred embodiment, an image of the secured shipping label is displayed on the local device where the encrypted confidential document content appears in a decrypted form as illustrated for example in FIG. 2B. If required, the confidential document content may be locally printed in a decrypted form or eventually the whole shipping label content may be printed in a decrypted form (act 328).

It will be understood by those skilled in the art that the method described above may be applied to any printed document, which requires to be secured in particular regarding some confidential document content, without departing from the spirit and scope of the invention. The system may be used in particular for documents such as official documents or personal or confidential statements exchanged between individuals or organizations, including the distribution of PIN codes for credit cards and bank cards. In the particular case of documents which require some authentication in order to avoid copying the documents or tampering with the documents, the security is ensured by the unfalsifiable and unique tag attached to the secured document. Following on the decryption of the secured document by a local user, a decrypted form of the document can eventually be printed by the user.

The invention claimed is:

1. A method for printing on a blank document including an attached tag a secured document constituted of non-confidential content readable by third parties and of encrypted confidential content whose access needs to be protected from unauthorized third parties, the method comprising:
   providing a blank document with said attached tag, containing a unique tag identification,
   reading said attached tag and extracting said unique tag identification contained in said attached tag,
   generating by a computer device a unique cryptographic key,
   associating by said computer device said unique cryptographic key with said unique tag identification in a database,
   storing in said computer device said unique tag identification and said unique cryptographic key,
   identifying confidential content to be encrypted,
   encrypting said confidential content in an encrypted form with at least said cryptographic key, and
   printing on said blank document said non-confidential content and said encrypted form of said confidential content resulting in said secured document.

2. The method of claim 1, wherein said confidential content is encrypted with said cryptographic key and said unique tag identification.

3. The method according to claim 1, wherein said reading and said printing are both performed by a printer having the capability to perform the reading of said attached tag.

4. The method of claim 3, wherein said attached tag is machine writeable and is written onto with said printer.

5. The method according to claim 1, wherein said reading is based on radio frequency technology and said attached tag is a radio frequency identification (RFID) tag or a near field communications (NFC) tag.

6. The method according to claim 1, wherein said attached tag contains other information than said unique tag identification and at least some of said other information is comprised in said data for printing said secured document, and the encrypted confidential content includes one or more of: identifications, addresses, or personal or confidential statements.

7. The method according to claim 1, wherein said secured document is a secured shipping label.

8. The method of claim 7, further comprising attaching said secured shipping label onto an item due to be shipped.

9. The method according to claim 7, wherein said blank document for printing said secured shipping label is self-adhesive and is provided on a roll.

10. A computerized system for printing on a blank document including an attached tag a secured document constituted of non-confidential content readable by third parties and of encrypted confidential content whose access needs to be protected from unauthorized third parties, of said attached tag containing a unique tag identification, the computerized system comprising: a tag reader for reading said attached tag and extracting said unique tag identification contained in said attached tag, a cryptographic module for generating a unique cryptographic key, first and second memory for storing said unique identification tag and said unique cryptographic key and a document management module, wherein said cryptographic module is operable to encrypt confidential content in an encrypted form with at least said unique cryptographic key, and a printer for printing on said blank document said non-confidential content and said encrypted form of said confidential content resulting in said secured document, wherein said document management module is operable to associate said unique cryptographic key with said unique tag identification in a database and identify said confidential content to be encrypted.

11. The computerized system according to claim 10, wherein said cryptographic module is operable to encrypt said confidential content with said cryptographic key and said unique tag identification.

12. The computerized system according to claim 10, wherein said document management module is operable to uniquely associate said unique cryptographic key with said unique tag identification.

13. The computerized system according to claim 10, wherein said tag reader is integrated in a print head of said printer.

14. The computerized system according to claim 10, wherein said tag reader is a radio frequency reader and said attached tag is a radio frequency identification (RFID) tag or a near field communications (NFC tag).

15. The computerized system according to claim 10, wherein said attached tag contains other information than said unique tag identification and at least some of said other information is comprised in said data for printing prepared by said document management module.

16. The computerized system according to claim 10, wherein said secured document is a secured shipping label.

17. The computerized system according to claim 16, wherein said printer comprises handling structure to handle rolls of blank shipping labels.

18. A method for decrypting a secured document constituted of non-confidential content readable by third parties and of encrypted confidential content whose access needs to be protected from unauthorized third parties and of an attached tag containing a unique tag identification, the method comprising:
    storing in a local computer device said unique tag identification and a unique cryptographic key,
    associating by said local computer device said unique tag identification and said unique cryptographic key,
    reading by said local computer device said attached tag and extracting said unique tag identification contained in said attached tag,
    comparing by said local computer device said extracted unique tag identification with said unique tag identification,
    selecting said unique cryptographic key associated with said unique tag identification based on a successful matching of said unique tag identification extracted from said attached tag with said unique tag identification, and
    capturing an image of said secured document for decrypting by said local computer device said encrypted confidential content from the captured image with at least said cryptographic key.

19. The method of claim 18, wherein said encrypted confidential content is decrypted with said cryptographic key and said unique tag identification.

20. The method according to claim 18, wherein said reading is based on radio frequency technology and said attached tag is a radio frequency identification (RFID) tag or a near field communications (NFC) tag.

21. The method according to claim 18, further comprising receiving said cryptographic key and said unique tag identification from a remote device.

22. The method according to claim 18, further comprising displaying an image of said secured document in a decrypted form, and the encrypted confidential content includes one or more of: identifications, addresses, or personal or confidential statements.

23. The method according to claim 18, further comprising printing said secured document in a decrypted form.

24. The method according to claim 18, wherein said secured document is a secured shipping label.

25. A local computer device for decrypting a secured document constituted of non-confidential content readable by third parties and of encrypted confidential content whose access needs to be protected from unauthorized third parties and of an attached tag containing a unique tag identification, the device comprising: a first memory for storing said unique tag identification and a second memory for storing a unique cryptographic key, a tag reader for reading said attached tag and extracting said unique tag identification contained in said attached tag, a processor for uniquely associating in a database said unique tag identification and said unique cryptographic key and for selecting said unique cryptographic key based on a successful matching of said unique tag identification extracted from said attached tag with said unique tag identification, a document capture module for capturing an image of said secured document, and a cryptographic module for decrypting said encrypted confidential content from the captured image with at least said cryptographic key.

26. The device according to claim 25, wherein said cryptographic module is operable to decrypt said encrypted confidential content with said cryptographic key and said unique tag identification.

27. The device according to claim 25, further comprising the database storing said cryptographic key and said unique tag identification and allowing for their association.

28. The device according to claim 25, wherein said tag reader is a radio frequency reader and said attached tag is a radio frequency identification (RFID) tag or a near field communications (NFC) tag.

29. The device according to claim 25, further comprising a communication module operable to receive said cryptographic key and said unique tag identification from a remote device.

30. The device according to claim 25, further comprising a display module having at least one display operable to display an image of said secured document in a decrypted form.

31. The device according to claim 25, wherein the device is a mobile device.

32. The device according to claim 25, further comprising a printer operable to print said secured document in a decrypted form, and the encrypted confidential content includes one or more of: identifications, addresses, or personal or confidential statements.

33. The device according to claim 25, wherein said secured document is a secured shipping label.

34. A secured document constituted of an attached tag and of non-confidential content readable by third parties and of encrypted confidential content whose access needs to be protected from unauthorized third parties wherein said non-confidential content and encrypted confidential content are printed on a blank document comprising said attached tag, wherein said attached tag contains a unique tag identification and said encrypted confidential content is encrypted with a cryptographic key associated with said unique tag identification.

35. The secured document according to claim 34, wherein said encrypted confidential content is encrypted with said cryptographic key and said unique tag identification.

36. The secured document according to claim 34, wherein said attached tag is unfalsifiable.

37. The secured document according to claim 34, wherein said attached tag is a radio frequency tag.

38. The secured document according to claim 34, wherein said attached tag contains a unique tag identifier embedded into the tag.

39. The secured document according to claim 38, wherein said unique tag identification is said unique tag identifier.

40. The secured document according to claim 34, wherein said attached tag contains other information than said unique tag identification and at least some of said other information is comprised in data printed on said secured document.

41. The secured document according to claim 34, wherein said attached tag contains only said unique tag identification.

42. The secured document according to claim 34, wherein said secured document is a secured shipping label consisting in a self-adhesive blank shipping label provided within a roll, on which is printed at least said encrypted content.

* * * * *